Dec. 27, 1938.　　J. W. ASPENLEITER　　2,141,285
OPHTHALMIC MOUNTING
Filed June 18, 1936

JOSEPH W. ASPENLEITER
INVENTOR
BY
ATTORNEYS

Patented Dec. 27, 1938

2,141,285

UNITED STATES PATENT OFFICE 2,141,285

OPHTHALMIC MOUNTING

Joseph W. Aspenleiter, Rochester, N. Y., assignor to Bausch & Lomb Optical Company, Rochester, N. Y., a corporation of New York Application June 18, 1936, Serial No. 85,949

1 Claim. (Cl. 88—48)

The present invention relates to ophthalmic mountings and more particularly to means for rockably securing a nose pad on a pad supporting arm.

One of the objects of the present invention is to provide a simple and efficient nose pad connection for ophthalmic mountings. Another object is to provide an ophthalmic mounting in which the nose pad can be readily and easily attached or detached. These and other objects and advantages reside in certain novel features of construction, arrangement and combination of parts as will hereinafter be more fully set forth and pointed out in the appended claim.

Referring to the drawing.

Figure 1:
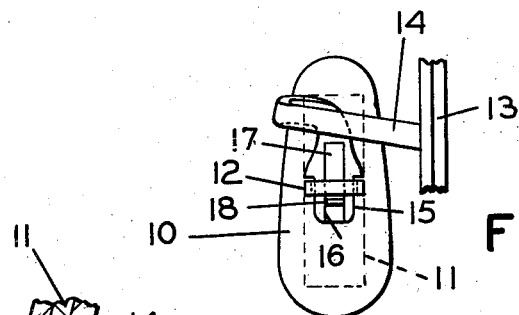
Fig. 1 is a rear view of a nose pad connection embodying my invention.
Figure 2:
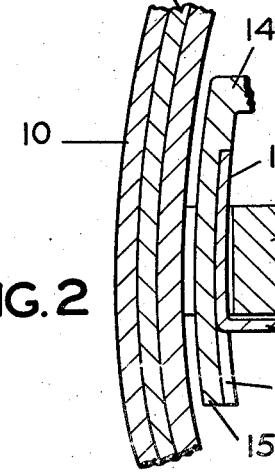
Fig. 2 is an enlarged fragmentary vertical section thereof.
Figure 3:
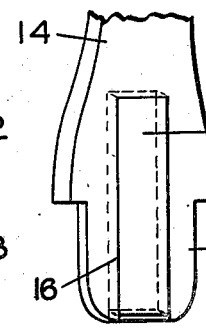
Fig. 3 is a rear view of the pad supporting arm.
Figure 4:
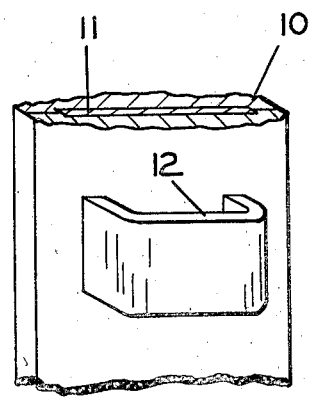
Fig. 4 is a fragmentary rear perspective view of the nose pad.

One embodiment of this invention is illustrated in Figs. 1 to 4 wherein 10 indicates a nose pad which may be either metallic or non-metallic. In the embodiment shown, the nose pad 10 comprises a body of non-metallic material such as zylonite or the like in which is embedded a metallic insert 11. A metallic loop 12 is secured to the nose pad and extends from the rear surface thereof.

Extending rearwardly from the eye wire 13 is the pad supporting arm 14 which has a reduced end portion 15 to extend loosely within the loop 12. The front surface of the reduced portion 15 is curved and rockably engages the rear surface of the nose pad 10. A groove 16 is formed in the rear surface of the reduced end portion 15 of the pad arm 14 and a bendable metallic strip 17 is suitably secured at its inner end within the groove 16 by soldering or the like, for example. After the reduced end portion 15 is inserted within the loop 12, the outer end of the strip 17 is bent upward as indicated at 18 and the nose pad 10 is thus rockably secured on the supporting arm 14. All that is necessary for removal of the pad 10 from the arm 14 is to bend the end 18 of the strip 17 and slide the pad 10 off the arm 14.

Figure 5:
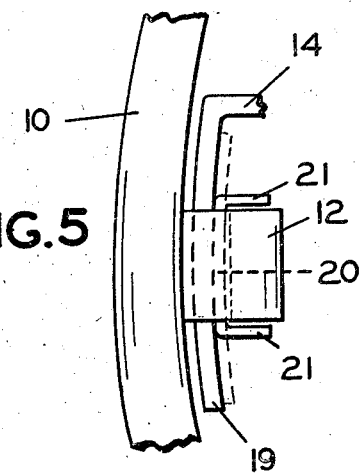
Fig. 5 is a fragmentary side elevation of a modification.
Figure 6:
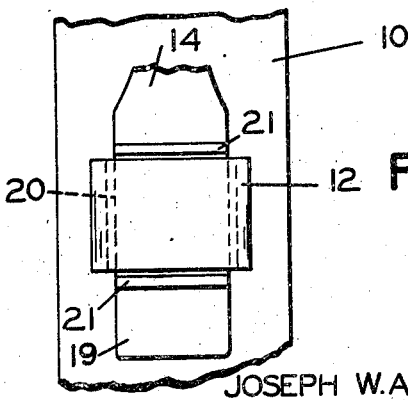
Fig. 6 is a fragmentary rear view thereof.

In the embodiment shown in Figs. 5 and 6, there is no groove in the rear face of the end portion 19 of the pad supporting arm 14. The metallic strip 20 is secured at its center to the rear face of the end portion 19 as by soldering or the like, for example, and both ends 21 are bent up so as to loosely engage the sides of the loop 12. By bending the outer end 21 flat, the pad may be readily removed.

From the foregoing, it will be apparent that I am able to attain the objects of my invention and provide a simple and efficient ophthalmic mounting from which the nose pad may be readily attached or detached. Obviously either modification could be made with or without the groove and the nose pad or arm may be of any desired form. Various other modifications can also be made without departing from the spirit of my invention or the scope of the appended claim.

I claim:

In an ophthalmic mounting, a nose pad having a loop on its rear surface, a pad supporting arm having a reduced end portion adapted to extend into said loop, one side of said reduced portion being curved and adapted to engage the rear surface of said pad, the other side of said reduced portion having a groove therein, and a strip of bendable material secured within said groove, said strip being bent upward beyond said loop to prevent removal of said arm from said loop.

JOSEPH W. ASPENLEITER.